(12) United States Patent
Araya

(10) Patent No.: US 12,304,261 B2
(45) Date of Patent: May 20, 2025

(54) AUTOMATED TOWING SYSTEM COMPRISING A CENTRAL BODY FORMED BY TWO ANCHORING YOKES, ONE LOCATED AT EACH END OF SAID BODY, A REAR WHEEL ASSEMBLY AND A FRONT WHEEL ASSEMBLY FOR THE MOVEMENT THEREOF, AND A HYDRAULIC POWER PACK

(71) Applicant: SOCIEDAD DEL ALTO PRODUCCIONES SPA, Antofagasta (CL)

(72) Inventor: Mario Alberto Reygadas Araya, Santiago (CL)

(73) Assignee: SOCIEDAD DEL ALTO PRODUCCIONES SPA, Antofagasta (CL)

( * ) Notice: Subject to any disclaimer, the term of this patent is extended or adjusted under 35 U.S.C. 154(b) by 639 days.

(21) Appl. No.: 17/767,093

(22) PCT Filed: Nov. 23, 2020

(86) PCT No.: PCT/CL2020/050161
§ 371 (c)(1),
(2) Date: Apr. 7, 2022

(87) PCT Pub. No.: WO2021/072568
PCT Pub. Date: Apr. 22, 2021

(65) Prior Publication Data
US 2022/0363097 A1    Nov. 17, 2022

(30) Foreign Application Priority Data
Oct. 14, 2019   (CL) .................................. 2914-2019

(51) Int. Cl.
*B60D 1/66*    (2006.01)
*B60D 1/26*    (2006.01)

(52) U.S. Cl.
CPC ............... *B60D 1/665* (2013.01); *B60D 1/26* (2013.01)

(58) Field of Classification Search
CPC .................................. B60D 1/665; B60D 1/26
See application file for complete search history.

(56) References Cited

U.S. PATENT DOCUMENTS

| 5,306,037 A | 4/1994 | Robertson |
| 11,702,163 B2 * | 7/2023 | Edmonson ................ B60P 3/07 280/476.1 |

FOREIGN PATENT DOCUMENTS

| CN | 201914034 U | 8/2011 |
| CN | 110588488 A | 12/2019 |

(Continued)

OTHER PUBLICATIONS

International Search Report, Inapi, Av. Libertador Bernardo O'Higgins 194, Piso 17, Santiago, Chile, Dec. 30, 2020.

*Primary Examiner* — Kevin Hurley
(74) *Attorney, Agent, or Firm* — Bay State IP, LLC

(57) ABSTRACT

A towing system for trucks, such as traction cables or drawbars is provided, which is made up of a central body with two anchoring yokes, a rear one and a front one, located at each end of the central body. The system is characterized in that the anchoring forks have pivot lugs that allow their connection to the central body by means of bolts, with the forks having hydraulic anchoring cylinders at their ends to connect the system to trailers and towed trucks. The central body has a set of rear wheels and a set of front wheels for its movement, which, by means of a remotely controlled hydraulic system, allows the wheels to be raised. Mounted on the main body, between the rear wheel assembly and the (Continued)

front wheel assembly, is a hydraulic power pack that allows all towing functions to be performed automatically.

7 Claims, 1 Drawing Sheet

(56) References Cited

FOREIGN PATENT DOCUMENTS

| | | | |
|---|---|---|---|
| DE | 102014011894 B4 | | 7/2016 |
| GB | 1414727 A | | 11/1975 |
| WO | 1981000086 A1 | | 1/1981 |
| WO | WO-8100086 A1 | * | 1/1981 |

* cited by examiner

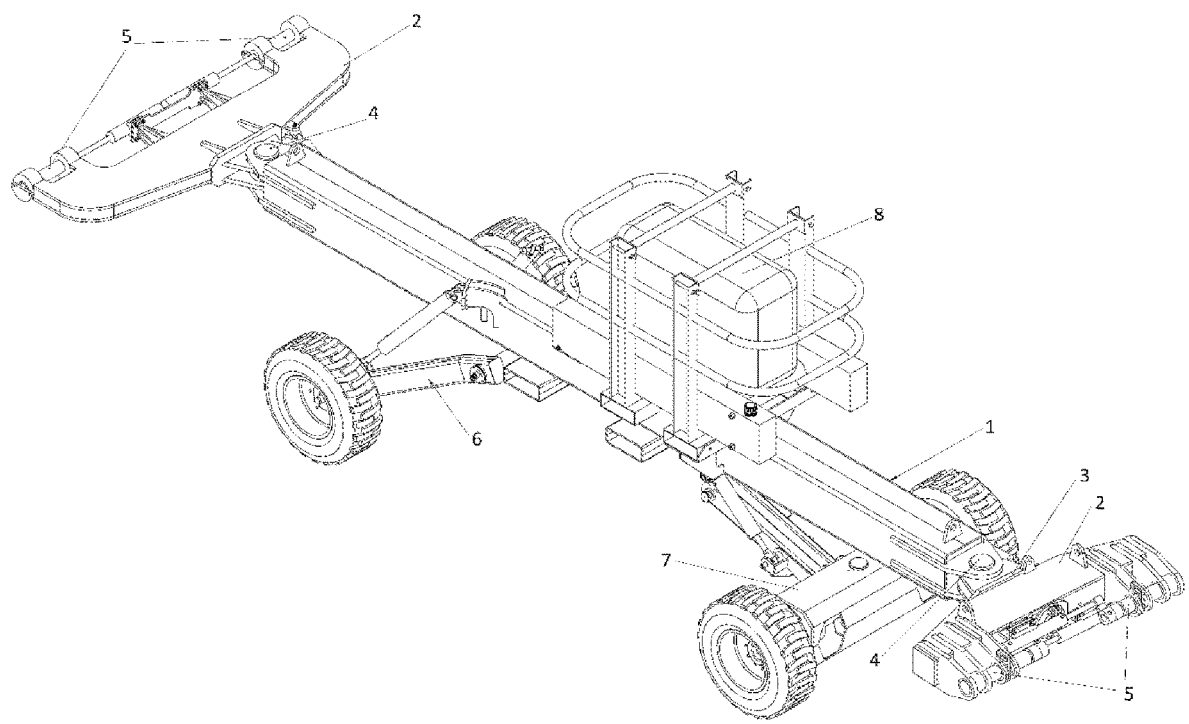

AUTOMATED TOWING SYSTEM COMPRISING A CENTRAL BODY FORMED BY TWO ANCHORING YOKES, ONE LOCATED AT EACH END OF SAID BODY, A REAR WHEEL ASSEMBLY AND A FRONT WHEEL ASSEMBLY FOR THE MOVEMENT THEREOF, AND A HYDRAULIC POWER PACK

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/CL2020/050161 filed on Nov. 23, 2020, and which in turn claims priority under 35 USC 119 to Chilean Application No. 2914-2019 filed on Oct. 14, 2019.

Currently, there are numerous ways to tow a truck in the event of a breakdown, or a stoppage, such as fixed joints, cranes, or traction cables, which allow the truck to be joined to another one in good condition which performs the function of tug unit.

This invention corresponds to an automated towing system, which allows a rigid connection between trucks, during the transfer of a truck with faults or in panne, to the repair shops, limiting the possibility that both trucks collide.

The system is made up of a solid, bar-type structure, made of special steel, called the central body. The central body has a rear train and a front train for its mobility, and they are joined to this structure using a pin system, a front yoke, and a rear yoke. Both yokes at their ends have cylinders powered hydraulically.

The trailer system under its structure has a hydraulic system, with four wheels and their respective tires, which allowed the complete movement of the entire trailer structure. A hydraulic central power unit is installed on the body, driven by a diesel fuel engine. This central system has an electronic module that is connected to a remote control.

This remote control allows the complete structure of the towing system to be moved, in remote connection with the hydraulic mobility system of its four wheels, to position the towing system. The remote control then enables the hydraulic cylinders of both front and rear yokes to be actuated, thus performing the coupling maneuver between both trucks (tractor or tug truck and faulty or panned truck). Once the maneuver of anchoring the towing system to the towed truck and the towing truck has been carried out, remotely and with a medium torque of the hydraulic system, the wheels of the system are raised to prevent them from being in contact with the ground during the towing procedure.

With this system, direct human intervention in the anchoring operation between trucks is eliminated, reducing people's exposure to risk. In addition, the hydraulic central unit of the towing equipment remotely allows delivering of the necessary hydraulic power to the truck in failure or panne, achieving with this action the activation of the steering system, the brake system, and lifting action of the hopper.

Unlike traditional towing systems that use chains, sling ropes, and straps, which requires changing the position of such components to relocate the trucks, the installation of this towing system requires a single maneuver during the transfer process. This towing system avoids the potential dangers of landslides, maneuvers around bends, possible collisions from the rear in descents, or the sudden breaking down of the towing truck.

The system is made up of a central body (1) with 2 anchoring yokes (2), one at the rear and one at the front, located one at each end of the central body, with pivot lugs (3) that allow it to be attached to the central body, with a set of pins (4), the yokes have hydraulic anchoring cylinders (5) at their ends to connect the system to the towed and towing truck. The central body has a rear train (6) and a front train (7) for its mobility, a hydraulic system with four wheels, and their respective tires. A remotely controlled system allows the lifting of the wheels of the towing system.

Mounted on the main body and between the front and rear axles is a hydraulic power plant, a diesel engine, and an electronic module connected to a remote control that allows the towing system to be maneuvered remotely between trucks, remotely anchored between the tractor truck or trailer and the truck in failure or panne. In addition to the hydraulic central unit of the towing equipment, it remotely allows the delivery of the necessary hydraulic power to the truck in failure or panne, achieving with this action the activation and operation of the steering system, the brakes system and the lifting action or hoisting of the hopper.

FIG. 1 illustrates a perspective view of the automated towing system.

DRAWING DESCRIPTION

1.—CENTRAL BODY
2.—ANCHOR YOKE
3.—PIVOT LUGS
4.—PINS
5.—ANCHOR PINS
6.—REAR TRAIN
7.—FRONT TRAIN
8.—HYDRAULIC CONTROL UNIT

The invention claimed is:

1. A towing system for trucks, such as traction cables or drawbars, that is CHARACTERIZED by being made up of a central body (1), with two anchoring yokes (2), a rear one and a front one, located at each end of the central body, pivot lugs (3) that allow their connection to the central body with bolts (4), with the yokes having hydraulic anchoring cylinders (5) at their ends to connect the system to the towing truck with the towed truck; wherein the central body has a set of rear wheels (6), and a set of front wheels (7) for its movement, which, assisted by a remotely controlled hydraulic system, allows the wheels to be raised; and wherein a hydraulic power pack (8) is mounted on the main body, between the rear wheel assembly and the front wheel assembly, that allows all towing functions to be performed automatically.

2. The towing system according to claim 1 is CHARACTERIZED that it can be used in towing of all types of trucks and mining extraction equipment.

3. The towing system according to claim 1 is CHARACTERIZED that it allows a rigid connection between trucks or mining equipment during their removal from the site, thus avoiding the risk of collision between them.

4. The towing system according to claim 1 is CHARACTERIZED that it allows remote assistance to the truck with a breakdown, in the functions of lifting the hopper, steering, and braking, thus avoiding putting people's safety at risk.

5. The towing system according to claim 1 is CHARACTERIZED that it can be used without additional maneuvers for any type of truck, regardless of whether it has extended bumpers.

6. The towing system according to claim 1 is CHARACTERIZED that by having a built-in remotely operated hydraulic system, it facilitates the coupling between the towing truck and the towed truck without the direct intervention of operators.

7. The towing system according to claim 1 is CHARACTERIZED that a single installation maneuver is required during the entire process of moving the truck.

\* \* \* \* \*